United States Patent
Vasquez

(10) Patent No.: US 8,816,534 B1
(45) Date of Patent: Aug. 26, 2014

(54) SYSTEM AND METHOD FOR GENERATING, STORING AND TRANSFERRING ELECTRICAL POWER BETWEEN A VEHICLE AND AN AUXILIARY APPLICATION

(76) Inventor: Ricardo Vasquez, Bensalem, PA (US)

( * ) Notice: Subject to any disclaimer, the term of this patent is extended or adjusted under 35 U.S.C. 154(b) by 344 days.

(21) Appl. No.: 13/271,204

(22) Filed: Oct. 11, 2011

(51) Int. Cl.
*H02J 9/00* (2006.01)
*H01M 10/44* (2006.01)
*H02J 7/00* (2006.01)
*B61C 3/00* (2006.01)
*H02J 9/06* (2006.01)
*B60L 11/18* (2006.01)
*H01M 10/46* (2006.01)

(52) U.S. Cl.
CPC .............. *H02J 9/062* (2013.01); *H01M 10/465* (2013.01); *B60L 11/1801* (2013.01)
USPC ................ 307/64; 320/101; 320/109; 105/50

(58) Field of Classification Search
CPC ... Y02T 10/7005; Y02T 90/127; H02J 7/355; H01M 10/456
USPC ................ 320/104, 101, 109; 105/50; 307/64
See application file for complete search history.

(56) References Cited

U.S. PATENT DOCUMENTS

| | | | | |
|---|---|---|---|---|
| 4,977,351 A * | 12/1990 | Bavaro et al. | ...................... | 315/87 |
| 5,545,967 A * | 8/1996 | Osborne et al. | .............. | 320/109 |
| 5,847,537 A * | 12/1998 | Parmley, Sr. | .................. | 320/109 |
| 6,653,749 B2 * | 11/2003 | Delbridge | ........................ | 307/85 |
| 7,661,370 B2 * | 2/2010 | Pike et al. | ........................ | 105/50 |
| 8,102,076 B2 * | 1/2012 | Baumann et al. | ............... | 307/9.1 |
| 8,384,244 B2 * | 2/2013 | Peterson et al. | ................ | 307/66 |
| 2007/0080586 A1 * | 4/2007 | Busick | ............................ | 307/64 |
| 2011/0049992 A1 * | 3/2011 | Sant'Anselmo et al. | ....... | 307/64 |
| 2011/0221384 A1 * | 9/2011 | Scheucher | ..................... | 320/101 |

* cited by examiner

*Primary Examiner* — M'Baye Diao
(74) *Attorney, Agent, or Firm* — LaMorte & Associates, P.C.

(57) ABSTRACT

A system of charging and utilizing rechargeable battery packs. A vehicle is provided that has an internal vehicle battery rack with removable battery packs. The vehicle recharges the battery packs when in operation. An auxiliary battery rack is provided that is separate from the vehicle. The auxiliary battery rack can also receive the rechargeable battery packs. A power inverter converts direct current from the rechargeable battery packs to alternating current. To utilize the system, the battery packs are charged by the vehicle. Once charged, at least one of the rechargeable battery packs is moved to the auxiliary battery rack. Once engaged with the auxiliary battery rack, the power inverter converts power from the rechargeable battery packs into alternating current. The alternating current is then used to power circuits in a building or to provide a mobile AC power source that can be used in place of a mobile generator.

12 Claims, 3 Drawing Sheets

SYSTEM AND METHOD FOR GENERATING, STORING AND TRANSFERRING ELECTRICAL POWER BETWEEN A VEHICLE AND AN AUXILIARY APPLICATION

BACKGROUND OF THE INVENTION

1. Field of the Invention

In general, the present invention relates to portable battery packs that can be used to provide DC power to a vehicle and/or AC power to a structure. More specifically, the present invention relates to systems in both vehicles and structures that retain, interconnect, draw power from, and charge portable battery packs.

2. Prior Art Description

There are many electric automobiles being sold. There are also many hybrid automobiles being sold. Both electric automobiles and hybrid automobiles have various electrical motors that are capable of propelling the vehicle. Both types of vehicles also contain storage batteries that are capable of storing enough electricity to power the electrical motors for a prolonged period of time.

In electric vehicles, the storage batteries are charged by connecting the batteries to a charger when the vehicle is not in use. In a hybrid vehicle, the storage batteries are charged by an alternator that is powered by an internal combustion engine when the vehicle is traveling at a high rate of speed. Regardless of whether the vehicle is an electric vehicle or a hybrid vehicle, the storage batteries are typically bolted into the vehicle assembly and are not intended to be removed from the vehicle by anyone other than a certified mechanic.

In many instances of use, a hybrid vehicle or an electric vehicle typically reaches its destination with a significant charge still being stored within the storage batteries. As with most all vehicles, electric vehicles and hybrid vehicles rest for most of the day. In the United States, a typical privately owned vehicle could be used for less than one hour each day. Accordingly, for most of the life of a vehicle, the electrical charge being held by the storage batteries of the vehicle are not being utilized.

There are many instances in everyday life in which a portable source of electricity would be handy. It is for this reason that portable gasoline powered generators are popular. However, gasoline powered generators cannot be used indoors. Furthermore, gasoline powered generators are typically heavy and are difficult to manually move from place to place. Gasoline powered generators are also very bulky and are difficult to transport using a passenger car, especially a compact car.

A need therefore exists for a system and method of converting the excess electrical charge stored in a vehicle's batteries into a usable form of AC power. A need also exists for a system that can readily remove a storage battery from a vehicle for use as a power source at a location remote from the vehicle. These needs are met by the present invention as described and claimed below.

SUMMARY OF THE INVENTION

The present invention is a system and method of charging and utilizing battery power from a plurality of rechargeable battery packs. A vehicle is provided that has an internal vehicle battery rack. The vehicle battery rack is capable of receiving and electrically interconnecting with the rechargeable battery packs when the rechargeable battery packs are placed within the vehicle battery rack. The vehicle recharges the rechargeable battery packs when the rechargeable battery packs are in the vehicle battery rack and the vehicle is in operation.

An auxiliary battery rack is provided that is separate and remote from said vehicle. The auxiliary battery rack can also selectively receive and electrically interconnect with the rechargeable battery packs when said rechargeable battery packs are placed into the auxiliary battery rack.

A power inverter is electrically connected to the auxiliary battery rack. The power inverter converts direct current from said rechargeable battery packs to alternating current.

To utilize the system, the rechargeable battery packs are charged on the vehicle battery rack by the vehicle. Once charged, at least one of the rechargeable battery packs is moved from the vehicle battery rack to the auxiliary battery rack. Once engaged with the auxiliary battery rack, the power inverter converts power from the rechargeable battery packs into alternating current. The alternating current is then used to power circuits in a building or to provide a mobile AC power source that can be used in place of a mobile generator.

The system can also operate in reverse. In reverse, the battery packs are connected to the auxiliary battery rack. A charger is then used to charge the battery packs. The charged battery packs can then be moved to the vehicle battery rack within a vehicle, where the battery packs power the electrical needs of the vehicle.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system can be embodied in many ways, the embodiment illustrated shows the system having battery packs that can be selectively attached to a vehicle, a stationary power unit, and a portable power unit. These embodiments are selected in order to set forth the best modes contemplated for the invention. The illustrated embodiments, however, are merely exemplary and should not be considered a limitation when interpreting the scope of the appended claims.

Figure 1:
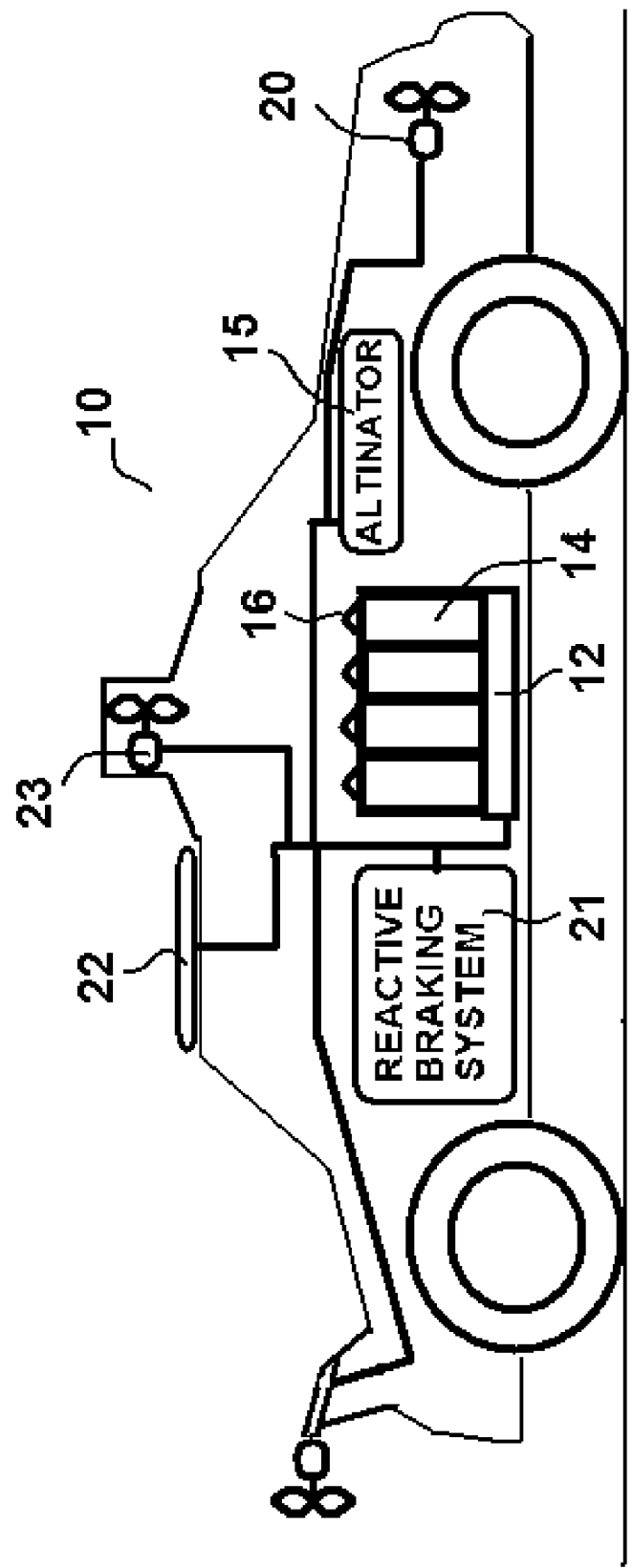
FIG. 1 is a schematic of an exemplary embodiment of the vehicle component of the present invention system.

Referring to FIG. 1 a vehicle 10 is shown. The vehicle 10 can be an electric vehicle, a hybrid vehicle or a traditional gasoline powered vehicle. The vehicle 10 contains a vehicle battery rack 12 that holds one or more portable battery packs 14. The battery packs 14 are designed to be both rapidly removed from the vehicle battery rack 12 and installed into the vehicle battery rack 12, as will later be explained. Each battery pack 14 preferably weights under twenty pounds so that it can be readily lifted by most any adult. Each battery pack 14 also has an integral handle 16 that enables each battery pack 14 to be readily lifted by hand.

Each battery pack 14 preferably has enough cells to generate 12 volts DC when fully charged. However, battery packs that generate six or three volts can also be used, provided those battery packs are connected in series to produce 12 volts of direct current.

The number of battery packs 14 present in the vehicle 10 is dependent upon the operational requirements of the vehicle 10. For example, if a vehicle 10 requires 1000 watts of power, and each battery pack 14 is rated at 200 Watts, it will be understood that at least five battery packs 14 are present in the vehicle battery rack 12. In fact, it is preferred that the vehicle 10 have at least one more battery pack 14 than is required to operate the vehicle 10. Consequently, using the same example, it will be understood that if the vehicle 10 requires 1000 Watts of power to operate, at least six 200-Watt battery packs 14 would be supplied in the vehicle battery rack 12. In this manner, at least one of the battery packs 14 could be removed from the vehicle battery rack 12 and the vehicle 10 would still have the electrical power it needs to properly operate.

Unless the vehicle 10 is a purely electric vehicle that is charged from an external source, the vehicle 10 recharges the battery packs 14 on the vehicle battery rack 12 as the vehicle 10 operates. Normally, a traditional vehicle recharges its battery using an alternator 15 that is turned by the engine. Such a recharging system can be used as part of the preset invention. However, it is preferred that secondary recharging mechanism 20 also be present within the vehicle 10. The secondary recharging mechanism 20 may include reactive brake recharging system 21 that generate electricity when the brakes of the vehicle 10 are applied. The secondary recharging mechanism 20 can also employ at least one solar panel 22 that can trickle charge the battery packs 14, even when the vehicle 10 is at rest. However, the preferred secondary recharging mechanism 20 is at least one wind turbine 23.

Each wind turbine 23 is mounted to the vehicle 10. The wind turbine 23 can be under the hood of the vehicle 10, on the roof of the vehicle 10, on the sides of the vehicle 10, or at any other position that receives an unobstructed flow of air as the vehicle 10 travels at speed. The wind turbine 23 spins and generates electricity at a rate that is directly proportional to the speed that the vehicle 10 is traveling. In this manner, when the vehicle 10 is traveling at highway speeds in top gear and is efficiently using gasoline, the battery packs 14 are rapidly charged in a fuel efficient manner.

Once the battery packs 14 are fully charged, the electrical power in the battery packs 14 can be used to power the electrical systems of the vehicle 10. However, as is often the case, the vehicle 10 reaches its destination while the battery packs 14 are fully charged.

Figure 2:
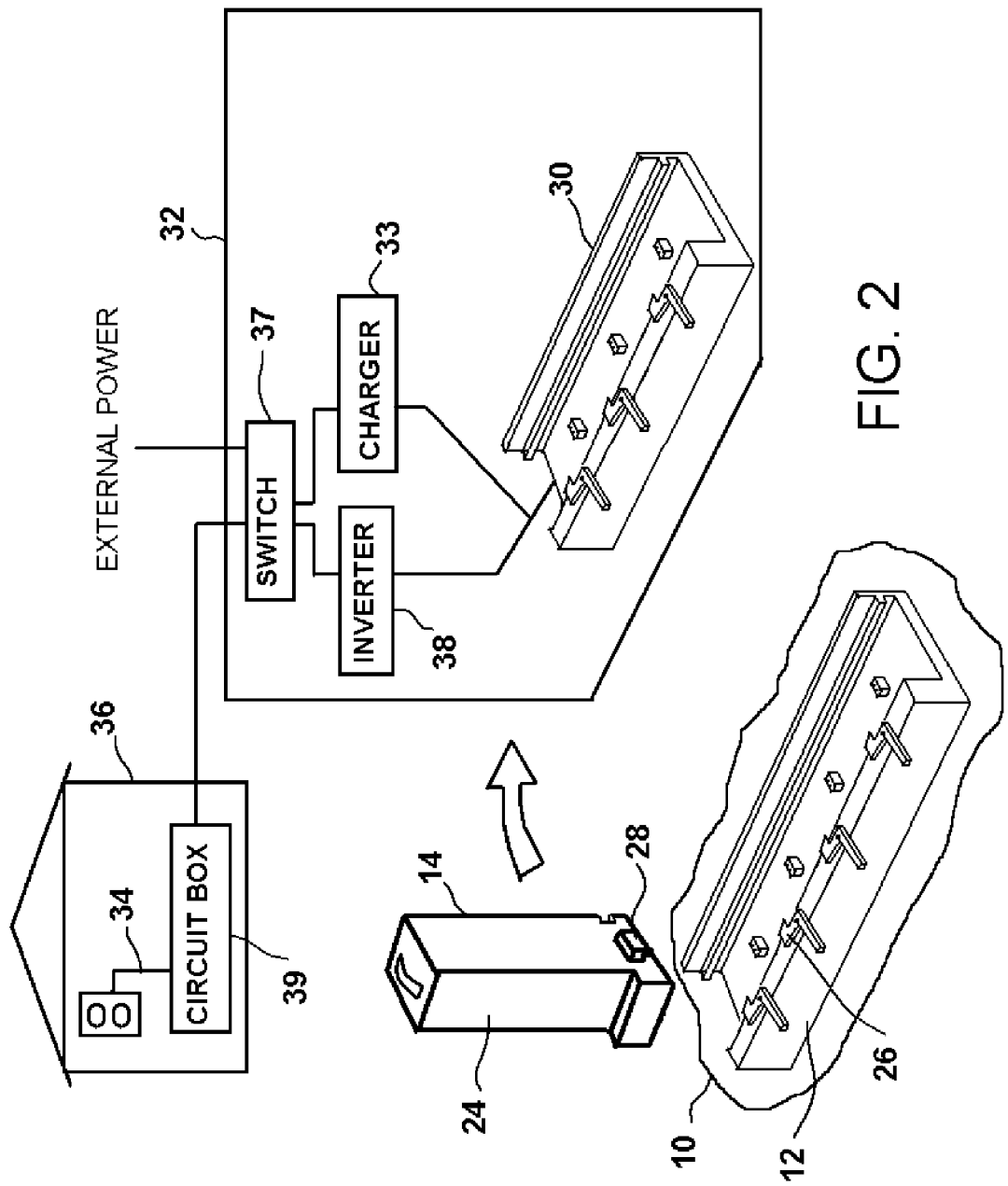
FIG. 2 is a schematic showing an stationary auxiliary station component of the present invention system shown in conjunction with the vehicle battery rack.

Referring to FIG. 2 in conjunction with FIG. 1, it can be seen that each battery pack 14 has a housing 24. The housing 24 connects to the vehicle battery rack 12 in the vehicle 10 using quick-connect mechanical fasteners 26, such as latches. Each battery pack 14 also has a connector 28 with electrodes that automatically interconnect with the vehicle battery rack 12 when the battery pack 14 is attached to the vehicle battery rack 12. When the battery pack 14 is removed from the vehicle battery rack 12 within the vehicle 10, the electrodes of the connector 28 disconnect and the battery pack 14 becomes electrically isolated.

Auxiliary battery racks are provided. The first auxiliary battery rack 30 is part of a stationary power unit 32 that is connected to the electrical circuitry 34 of a building 36, such as a home, shed or vacation cabin. The first auxiliary battery rack 30 is capable of holding multiple battery packs 14. The first auxiliary power rack 30 is connected to a power inverter 38 that converts the direct current of the battery packs 14 into the 60 Hz AC used to power buildings in North America.

The AC power is then fed through a supply switch 37 to the circuit breaker box 39 of the building 36. The supply switch 37 switches the incoming power source between the AC power from any incoming power company grid and the electrical power from the first auxiliary battery rack 30. Obviously, the supply switch 37 need not be used if the building 36 is solely dependent upon the first auxiliary power rack 30 for its electrical power needs.

It will therefore be understood that the DC power stored in the battery packs 14 of the vehicle 10 can be easily transferred into the AC power of a building 36 simply by manually moving one or more battery packs 14 from the vehicle battery rack 12 in the vehicle 10 to a first auxiliary battery rack 30 in a building 36. A good application for the present invention system would be a vacation cabin that a person may use only a few weeks out of the year. A person can place battery packs 14 in the vehicle battery rack 12 of the vehicle 10 and fully charge those battery packs 14 on the drive to the vacation cabin. Once at the vacation cabin, the fully charged battery packs 14 can be removed from the vehicle 10 and used to supply the AC power requirements of the vacation cabin. Should the battery packs 14 become depleted, the battery packs 14 can be returned to the vehicle 10 and recharged by running the vehicle 10. It will be understood that one or more of the battery packs 14 can be set into the first auxiliary battery rack 30 at the same time, depending upon the electrical needs of the vacation cabin.

In certain applications, the first auxiliary battery rack 30 and stationary power unit 32 can be used in reverse to charge the battery packs 14. The stationary power unit 32 is supplied with a charger 33. If the building 36 has a solar panel or is connected to a gasoline generator, the charger 33 can be used to charge the battery packs 14 placed in the first auxiliary battery rack 30. In this manner, the stationary power unit 32 can be used to charge the battery packs 14 for later use by either the building 36 or the vehicle 10.

Figure 3:
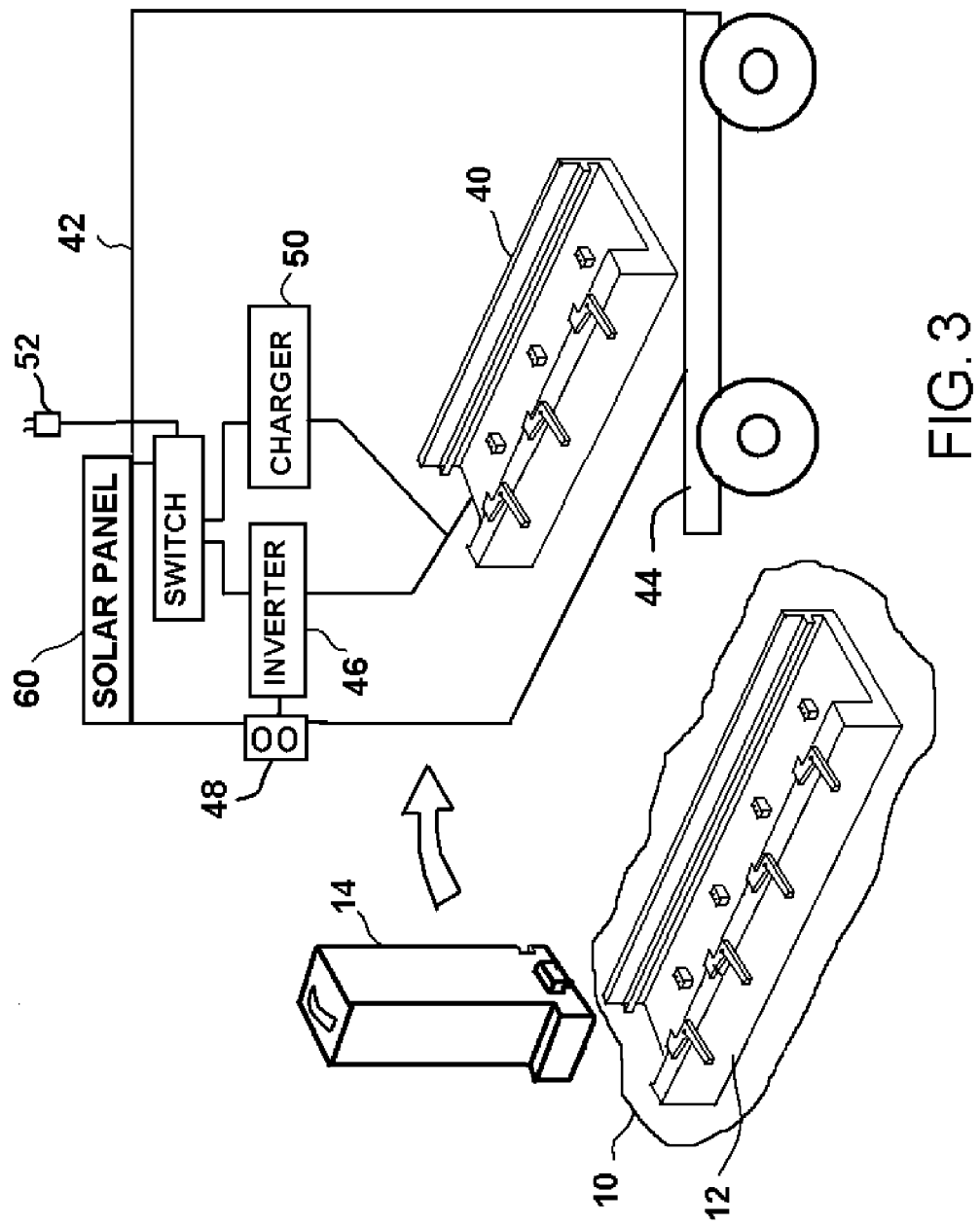
FIG. 3 is a schematic showing a mobile auxiliary station component of the present invention system shown in conjunction with the vehicle battery rack.

A second auxiliary battery rack 40 is shown in FIG. 3. The second auxiliary power rack 40 is part of a portable electrical supply unit 42. The portable electrical supply unit 42 has a wheeled cart 44 that enables the portable electrical supply unit 42 to be easily moved from point to point. The second auxiliary power rack 40 is also capable of holding one or more of the battery packs 14.

A power inverter 46 is supplied that converts the DC power of the battery packs 14 to the 60 Hz AC power, used in the power grid of North America. The inverter 46 is connected to one or more plug receptacles 48. Accordingly, the plug receptacles 48 are powered with AC power at 60 Hz.

The portable power unit 42 is used in place of a portable generator. To use the portable power unit 42, the wheeled cart 44 is rolled up to a vehicle 10 having charged battery packs 14. One or more charged battery packs 14 are then transferred from the vehicle battery rack 12 in the vehicle 10 to the second auxiliary battery rack 40 in the wheeled cart 44. Once the charged battery packs 14 are set into the wheeled cart 44, the wheeled cart 44 can be moved to any desired location. Any standard electrical appliance can then be plugged into the portable power unit 42. For example, a construction worker can utilize the portable power unit 42 to run power tools at a jobsite that does not otherwise have electricity.

The portable power unit 42 can also be used in reverse. A charger 50 is provided on the wheeled cart 44, as is an external plug 52. The plug 52 can be connected to any available power source, such as a power outlet in a garage. Once plugged in, the charger 50 charges the battery packs 14. Once fully charged, the battery packs 14 can be returned to the vehicle 10 for use within the vehicle 10. It will therefore be understood that the present invention system enables battery packs 14 from an electric vehicle or hybrid vehicle to be removed from the vehicle and remotely charged. This eliminates the need for the vehicle 10 to be parked near a power source. It also eliminates the need for a vehicle owner to run extension cords to a vehicle 10.

If no public grid power source is available, alternate power sources can be used to charge the battery packs 14. Referring to FIG. 3, it can be seen that a solar panel 60 can be attached to the portable power unit 42 to trickle charge the batter packs 14. Alternatively, the solar panel 60 can be replaced with any other available power source, such as a wind turbine or a traditional gasoline generator.

It will be understood that the embodiments of the present invention that are illustrated and described are merely exemplary and that a person skilled in the art can make many variations to those embodiments. For instance, the number, shape, size and power capacity of the battery packs can be altered. Likewise, the various battery racks can have many configurations. All such embodiments are intended to be included within the scope of the present invention as defined by the claims.

What is claimed is:

1. A method of charging and utilizing battery power, said method comprising the steps of:
providing a plurality of rechargeable battery packs;
providing a vehicle having a vehicle battery rack that selectively receives and electrically interconnects with said rechargeable battery packs, wherein said vehicle recharges said rechargeable battery packs when said rechargeable battery packs are received by said vehicle battery rack and said vehicle is in operation;
providing an auxiliary battery rack at a building that is separate and remote from said vehicle, wherein said auxiliary battery rack selectively receives and electrically interconnects with said rechargeable battery packs when said rechargeable battery packs are placed into said auxiliary battery rack;
providing a power inverter at said building that is electrically coupled to said auxiliary battery rack, wherein said inverter converts direct current from said rechargeable battery packs to alternating current at 60 Hz to provide electrical power to said building;
charging said rechargeable battery packs on said vehicle battery rack; and
moving at least one of said rechargeable battery packs from said vehicle battery rack to said auxiliary battery rack, wherein said power inverter converts power from said at least one of said rechargeable battery packs into said alternating current.

2. The method according to claim 1, further including the step of connecting said power inverter to at least one plug receptacle, wherein said power inverter supplies AC power to said at least one plug receptacle.

3. The method according to claim 1, further including the step of providing a wheeled cart, wherein said auxiliary battery rack and said power inverter are supported by said wheeled cart.

4. The method according to claim 1, wherein said step of providing a vehicle includes providing a vehicle that requires a minimum number of rechargeable battery packs to operate, and said step of providing a plurality of rechargeable battery packs includes providing a plurality of rechargeable battery packs in excess of said minimum number.

5. The method according to claim 4, wherein said step of moving at least one of said rechargeable battery packs includes moving said plurality of rechargeable battery packs in excess of said minimum number.

6. The method according to claim 1, wherein said step of providing a plurality of rechargeable battery packs includes providing separate battery packs, wherein each of said separate battery packs has a lifting handle.

7. The method according to claim 6, wherein each of said separate battery packs has an electrical connector that automatically interconnects with said vehicle battery rack when placed on said vehicle battery rack.

8. The method according to claim 7, wherein each said electrical connector automatically connects with said auxiliary battery rack when placed on said auxiliary battery rack.

9. The method according to claim 1, further including the steps of providing said vehicle with a supplemental charging system for charging said rechargeable battery packs on said vehicle battery rack, wherein said supplemental charging system is selected from a group consisting of wind turbines, solar panels and active braking systems.

10. A method of providing AC power using rechargeable batteries, said method comprising the steps of:
providing a plurality of rechargeable battery packs;
providing a vehicle having a vehicle battery rack that selectively receives and electrically interconnects with said rechargeable battery packs, wherein said vehicle recharges said rechargeable battery packs when said rechargeable battery packs are engaged with said vehicle battery rack and said vehicle is in operation;
providing an auxiliary battery rack at a building that is separate and remote from said vehicle, wherein said auxiliary battery rack selectively receives and electrically interconnects with said rechargeable battery packs when said rechargeable battery packs are engaged with said auxiliary battery rack;
providing a power inverter that is electrically coupled to said auxiliary battery rack, wherein said power inverter converts direct current from said rechargeable battery packs to alternating current at 60 Hz when at least one of said rechargeable battery packs is engaged with said auxiliary battery rack;
charging said rechargeable battery packs on said vehicle battery rack;
moving at least one of said rechargeable battery packs from said vehicle battery rack to said auxiliary battery rack, wherein said power inverter converts power from said at least one of said rechargeable battery packs into said alternating current to power said building.

11. The method according to claim 10, further including the step of connecting said power inverter to at least one plug receptacle, wherein said power inverter supplies AC power to said at least one plug receptacle.

12. The method according to claim 10, further including the step of providing a wheeled cart, wherein said auxiliary battery rack and said power inverter are supported by said wheeled cart.

* * * * *